(12) United States Patent
Oberhofer et al.

(10) Patent No.: US 8,845,319 B2
(45) Date of Patent: Sep. 30, 2014

(54) MEANS FOR MODIFYING A BUILDING SPACE AND DEVICE FOR MANUFACTURING A THREE-DIMENSIONAL OBJECT HAVING MEANS FOR MODIFYING A BUILDING SPACE

(75) Inventors: Johann Oberhofer, Stockdorf (DE); Robert Eichner, Penzberg (DE)

(73) Assignee: EOS GmbH Electro Optical Systems, Krailling (DE)

( * ) Notice: Subject to any disclaimer, the term of this patent is extended or adjusted under 35 U.S.C. 154(b) by 153 days.

(21) Appl. No.: 13/106,142

(22) Filed: May 12, 2011

(65) Prior Publication Data

US 2011/0293771 A1    Dec. 1, 2011

Related U.S. Application Data

(60) Provisional application No. 61/334,846, filed on May 14, 2010.

(30) Foreign Application Priority Data

May 12, 2010   (DE) .......................... 10 2010 020 416

(51) Int. Cl.
*B29C 35/08* (2006.01)
*B22F 3/105* (2006.01)
*B29C 67/00* (2006.01)

(52) U.S. Cl.
CPC ............. *B29C 67/0081* (2013.01); *B29C 35/08* (2013.01); *B22F 3/1055* (2013.01); *B29C 67/0077* (2013.01); *B29C 67/0085* (2013.01); *B22F 2003/1056* (2013.01)
USPC ........ 425/174.4; 425/375; 425/381; 425/470; 264/255; 264/497

(58) Field of Classification Search
CPC   B29C 35/08; B29C 67/0081; B29C 67/0077; B29C 67/0085; B22F 3/1055; B22F 2003/1056
USPC ...................... 425/174.4, 375, 470, 381, 461; 264/113, 405, 255, 497
See application file for complete search history.

(56) References Cited

U.S. PATENT DOCUMENTS 5,252,264 A * 10/1993 Forderhase et al. ........... 264/497
6,375,874 B1 * 4/2002 Russell et al. ................. 264/28
(Continued)

FOREIGN PATENT DOCUMENTS

| DE | 199 52 998 A1 | 5/2001 |
| DE | 102 35 427 A1 | 2/2004 |

(Continued)

OTHER PUBLICATIONS

Translation of DE 19952998. (date is not applicable).*

*Primary Examiner* — Dimple Bodawala
(74) *Attorney, Agent, or Firm* — Seyfarth Shaw LLP

(57) ABSTRACT

A means for modifying a building space for a device for manufacturing a three-dimensional object by layerwise solidification of a powdery building material at the locations corresponding to the object in the respective layers comprises one or several small supports (32) or one or several building space partitioning elements (20) on a building platform (2), thereby the device has one or several small building areas (22.1, 22.2, 22.3), in which the powdery material may be efficiently used and different powder materials may be processed.

17 Claims, 12 Drawing Sheets

(56) References Cited

U.S. PATENT DOCUMENTS

| | | | |
|---|---|---|---|
| 6,554,600 B1* | 4/2003 | Hofmann et al. | 425/174.4 |
| 6,764,636 B1* | 7/2004 | Allanic et al. | 264/401 |
| 7,296,990 B2* | 11/2007 | Devos et al. | 425/375 |
| 7,378,052 B2* | 5/2008 | Harryson | 419/7 |
| 7,597,835 B2* | 10/2009 | Marsac | 264/310 |
| 7,862,320 B2* | 1/2011 | Kumagai et al. | 425/174.4 |
| 2004/0004303 A1* | 1/2004 | Iskra | 264/109 |
| 2004/0084814 A1* | 5/2004 | Boyd et al. | 264/497 |
| 2004/0164461 A1* | 8/2004 | Ahmad et al. | 264/401 |
| 2004/0170765 A1* | 9/2004 | Ederer et al. | 427/355 |
| 2005/0053798 A1* | 3/2005 | Maekawa et al. | 428/542.8 |
| 2005/0225007 A1* | 10/2005 | Lai et al. | 264/308 |
| 2005/0263932 A1 | 12/2005 | Heugel | |
| 2006/0108712 A1 | 5/2006 | Mattes | |
| 2006/0208396 A1* | 9/2006 | Abe et al. | 264/497 |
| 2007/0026099 A1* | 2/2007 | Hagiwara | 425/174.4 |
| 2007/0063372 A1* | 3/2007 | Nielsen et al. | 264/113 |
| 2008/0131104 A1 | 6/2008 | Philippi | |
| 2008/0131546 A1* | 6/2008 | Perret et al. | 425/143 |
| 2008/0217818 A1* | 9/2008 | Holmboe et al. | 264/401 |
| 2009/0169664 A1* | 7/2009 | Cox | 425/174.4 |
| 2009/0326706 A1* | 12/2009 | Fink et al. | 700/212 |
| 2011/0133367 A1* | 6/2011 | Weidinger et al. | 264/497 |
| 2011/0278773 A1* | 11/2011 | Bokodi et al. | 264/497 |
| 2011/0293770 A1* | 12/2011 | Ackelid et al. | 425/174.4 |
| 2012/0139166 A1* | 6/2012 | Abe et al. | 264/497 |

FOREIGN PATENT DOCUMENTS

| | | | |
|---|---|---|---|
| DE | 102 35 434 A1 | 2/2004 | |
| DE | 199 52 998 B4 | 4/2004 | |
| DE | 10 2004 041 633 A1 | 3/2006 | |
| DE | 10 2005 024 790 A1 | 12/2006 | |
| JP | 2003245981 | 9/2003 | |
| JP | 2010510099 | 4/2010 | |
| WO | WO 9629192 A1 * | 9/1996 | B29C 67/00 |
| WO | 02085246 A2 | 10/2002 | |
| WO | 2008049384 A1 | 5/2008 | |
| WO | 2008103985 A2 | 8/2008 | |

* cited by examiner

MEANS FOR MODIFYING A BUILDING SPACE AND DEVICE FOR MANUFACTURING A THREE-DIMENSIONAL OBJECT HAVING MEANS FOR MODIFYING A BUILDING SPACE

CROSS REFERENCE TO RELATED APPLICATIONS

The present application claims priority to U.S. Provisional Application 61/334,846, filed May 14, 2010, and claims priority, under 35 U.S.C. §119, of DE Patent Application No. 10 2010 020 416.1, filed May 12, 2010. The entire disclosures of U.S. Provisional Application 61/334,846 and DE Patent Application No. 10 2010 020 416.1 are incorporated herein by reference.

FIELD OF THE INVENTION

The invention relates to means for modifying a building space for a device for manufacturing three-dimensional objects by layerwise solidification of a powdery building material at locations corresponding to the object in the respective layers, and to a device for manufacturing a three-dimensional object having means for modifying a building space.

BACKGROUND

Devices for manufacturing three-dimensional objects by layerwise solidification of a powdery building material, for example in the shape of a laser sintering machine, are comprised for example of a building area having a size of 250×250 mm like the EOSINT M270. Due to the large building space, such devices may be too large and inflexible for manufacturing small objects such as teeth inlays. Due to the large area of the building platform, it is required to apply a large amount of a powdery material, wherein only a small part thereof is processed into an object. Thereafter, the non-solidified material is recycled in a common manner. Thereby, the economic efficiency of the machine is reduced when manufacturing smaller objects.

Development of devices that are specifically suitable for manufacturing objects having small dimensions is usually not profitable due to the development work and manufacturing costs and the restricted usability of the devices.

Patent specification DE 199 52 998 B4 discloses a device for direct manufacture of bodies with a laminated structure from powdery substances having two building spaces and two associated storage containers. The bottoms of the building spaces and the storage containers are each connected to their own respective drives, thereby making the device complex and inflexible.

It is an object of the present invention to provide means for a device for manufacturing of objects by layerwise solidification of a powdery building material and such a device, so that a device having a large building space may be configured in a way that economic manufacture of objects having different dimensions is possible by layerwise solidification of the powdery building material.

This object and further developments of the invention are taught by the claims.

One aspect of the invention is a means for modifying a building space which enables downsizing or partitioning of the building space into one or multiple separate small building areas, in which objects having less powder input may be manufactured, or different kinds of powder may be processed in parallel. The means for modifying the building space has a simple construction and is therefore cost-effective, and may be easily retrofitted or removed.

BRIEF DESCRIPTION OF THE DRAWINGS

Further features and aims of the invention may be perceived from the description of embodiments on the basis of the figures. In the figures show.

DETAILED DESCRIPTION OF THE INVENTION

Figure 1:
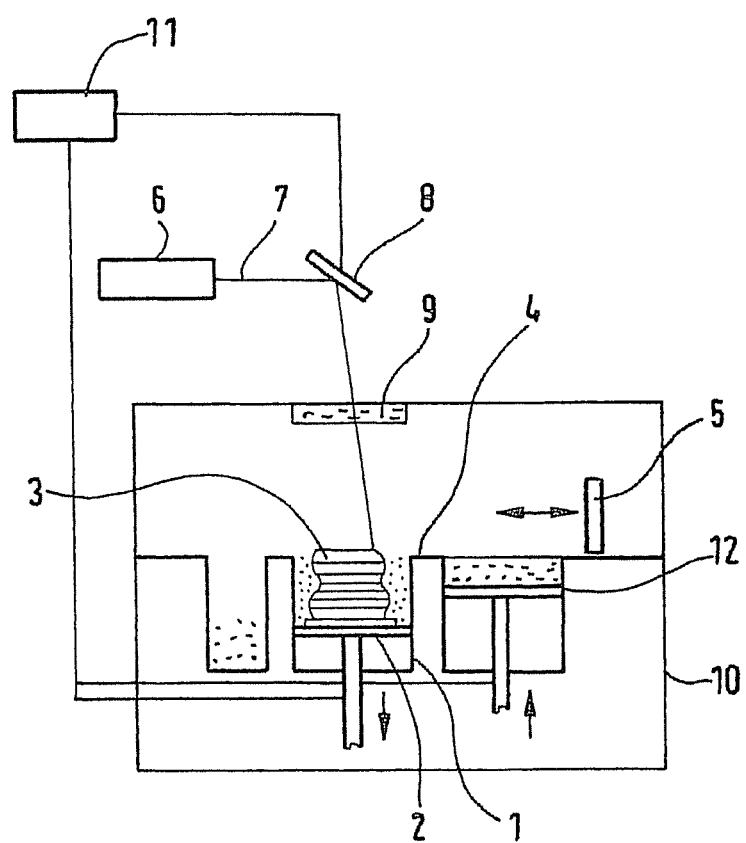
FIG. 1 a schematic view of an exemplary laser sintering device for manufacturing a three-dimensional object.

FIG. 1 shows a laser sintering device as an example of a device for layerwise manufacturing a three-dimensional object by means of a generative manufacturing method. The device includes a frame 1, which opens on the top and forms a building chamber, and which includes therein a support in the shape of a building platform 2 which is moveable in the vertical direction and supports the three-dimensional object 3 to be manufactured and defines a building field. The building platform 2 is adjusted in the vertical direction such that the layer of the object 3, which is to be solidified, lies within a building plane 4. Further, an application device 5 is provided for applying a powdery building material which can be solidified by electromagnetic radiation. An irradiation system includes a laser 6 as a source of the electromagnetic radiation. Further components of the irradiation system are deflection means 8, by which a laser beam 7 generated by the laser 6 is deflected to an injection window 9, passed therefrom through a process chamber 10 and focussed to a predetermined point within the building plane 4. Further, a control unit 11 is provided, by which the components of the device are controlled in a coordinated manner for performing the building process. The control unit 11 is operated amongst others in accordance with CAD data of the object to be manufactured. The device further includes a gas circulation- and gas preparing system which is not shown.

The powdery material is stored in a storage container and metering container 12, respectively, and it is supplied to the building field by the application device 5.

Regarding the powdery material, any powder and/or powder mixture suitable for the laser sintering method may be used. Such powders include for example synthetic powders such as polyamide or polysterene, PEEK, metal powders such as high quality steel powders or other metal powders which are adapted to the respective purpose, in particular alloys, as well as synthetic coated sand or ceramic powders.

The operation of the laser sintering device is conducted in a way that the application device 5 is moved over the building field and applies a powder layer in a predetermined thickness. Thereafter, the cross section of the object 3 in the respective layer is irradiated by the laser beam 7, and the powder is solidified there. Then, the building platform 2 is lowered, and a new powder layer is applied. The manufacture of the object 3 is performed in this manner layer by layer. After completion, the object 3 is removed and post-processed and/or subjected to quality control, if necessary.

Figure 2:
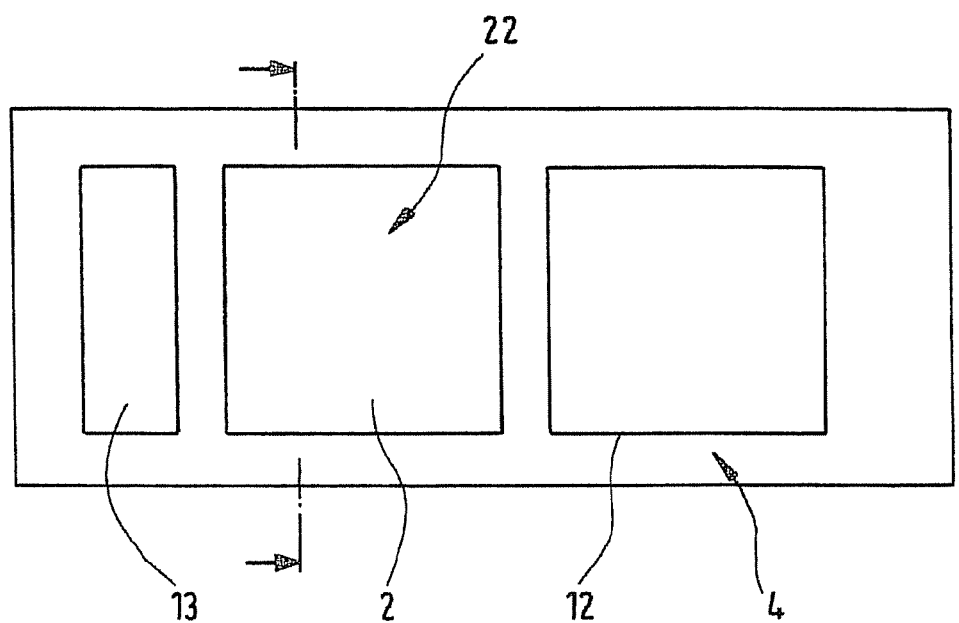
FIG. 2 a plan view of an exemplary building plane of a device, which can be re-equipped or retrofitted with the means for modifying a building space.

FIG. 2 exemplarily shows a plan view of a building plane 4 of a laser sintering device which can be equipped or retrofitted by a means for modifying a building space, in which the building platform 2 is spatially provided between the metering container 12 and an overflow container 13. Here, the term retrofittable means that the device is operable without the means for partitioning the building space, and that the means for partitioning the building space can be incorporated without modification of the device as such, wherein parts of the means for partitioning the building space can be fixed at parts of the device.

The metering container 12, the building platform 2, on which the powdery building material is transported and above which a building space 22 is formed, and the overflow container 13 have substantially the same width in the vertical direction of FIG. 2. The metering container 12 includes a stamp or a piston (not shown) for transporting the powder to the top.

The powdery building material is transported by an application device (not shown in FIG. 2) into the building space 22, and excessive powdery material falls into the overflow container 13 by further movement of the application device.

Figure 3:
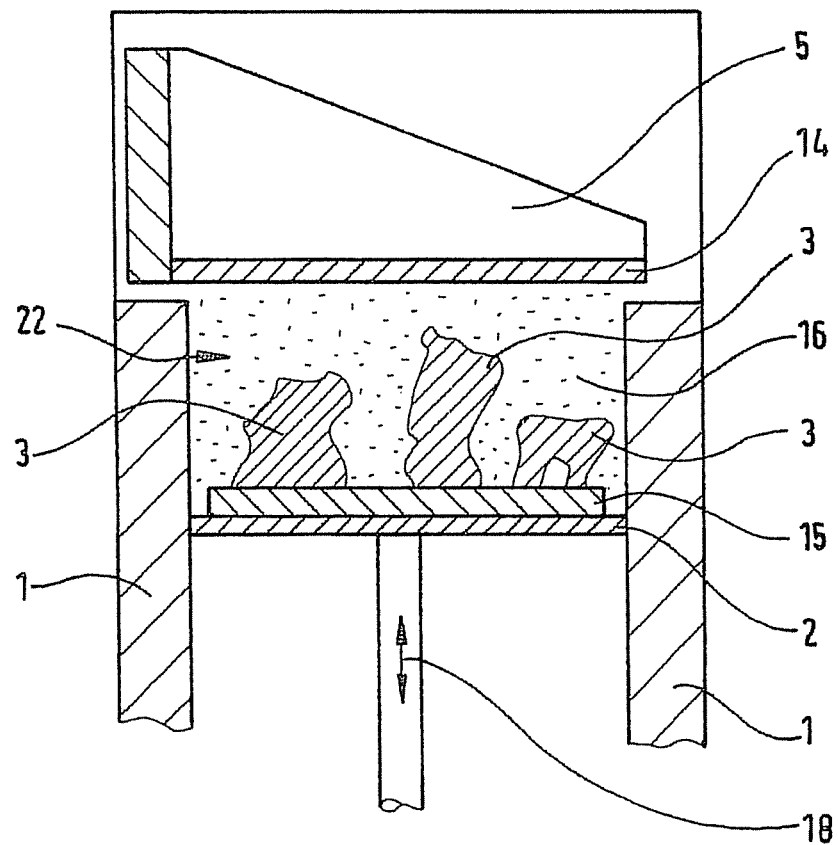
FIG. 3 a sectional view of an exemplary building chamber along an intersection line as shown in FIG. 2 at the end of a process of manufacturing of objects by layerwise solidification of a powdery building material.

FIG. 3 shows a sectional view of the building chamber along an intersection line as shown in FIG. 2, at the end of the process of manufacturing of objects by layerwise solidification of a powdery building material. An application device 5 is shown above the building space 22, in which three manufactured objects 3 are shown.

The building space 22 is confined below by the building platform 2 and laterally by the frame 1. The building plate 15 lies on the building platform 2, that is, within the building space 22, and does not necessarily reach up to the frame 1, as depicted in FIG. 3. The building space 22 is filled in the area surrounding the objects 3 by a powder 16, as the powdery building material, such that all objects 3, where the powder is solidified by the laser beam 7, are manufactured of the same powder. Hence, one or more objects 3 can be manufactured concurrently.

The application device 5 comprises a blade 14, by which the powder 3 is applied onto the building platform 2.

The building platform 2 may be moved vertically in height by a lifting mechanics 18 so that the height of the layer of the powder 16, which is applied by the application device 5, can be adjusted according to specific processing parameters.

Figure 4:
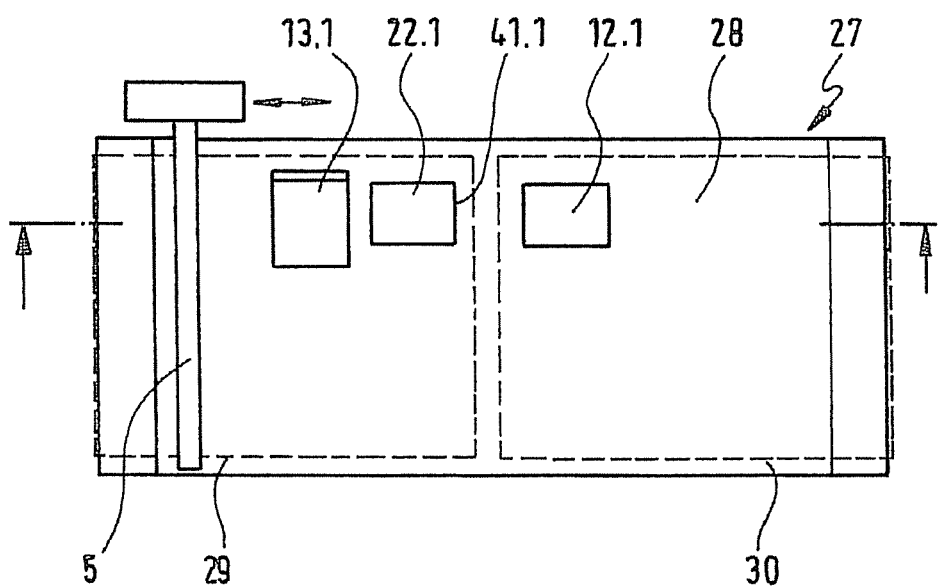
FIG. 4 a plan view of an exemplary assembly of a means for modifying a building space having a modified building area, in a device according to FIG. 1, according to an embodiment of the present invention.

FIG. 4 exemplarily shows a plan view of the assembly 27 of a means for modifying a building space in a first embodiment of the laser sintering device. The assembly comprises a base element which has the shape of a pan 28 here. The pan 8 has dimensions approximately corresponding to the areas of an original building area 29 and an original metering container area 30, which are originally contained in the device. The pan 28 has widthwise, in the vertical direction of FIG. 4, a border that is wider than the original building area 29 and the original metering container area 30. The area of the pan below the border is as wide as fits a clearance in the original building area 29 and the original metering container area 30, which is required for assembling. The pan 28 also fits lengthwise to a required clearance in the outer limitations of these areas. The border may also be embodied in a different manner, or the border may be omitted so that the pan 28 rests on an original intermediate wall 31.

In the pan 28, a confined building area 22.1 is provided, in which the three-dimensional objects can be manufactured. Building areas are spaces, which are partial areas of the building space 22, wherein the position of the building area 22.1 within the width dimension of the pan 28 may be arbitrarily selected, and the width may be set according to the objects 3 to be produced. The building area is confined by a confining means within the building area 22.

Further, the assembly 27 includes a metering container 12.1 for providing the powder and having smaller dimensions compared with the metering container 12.

Furthermore, an overflow container 13.1 having reduced dimensions compared to the overflow container 13 is provided in the pan 28. In an alternative embodiment, a wider overflow container may be provided.

Referring again to FIG. 4, the application device 5 is at a position after having transported the powder from the metering container 12.1 in the building area 22.1, and after having deposited excess powder into the overflow container 13.1.

Figure 5:
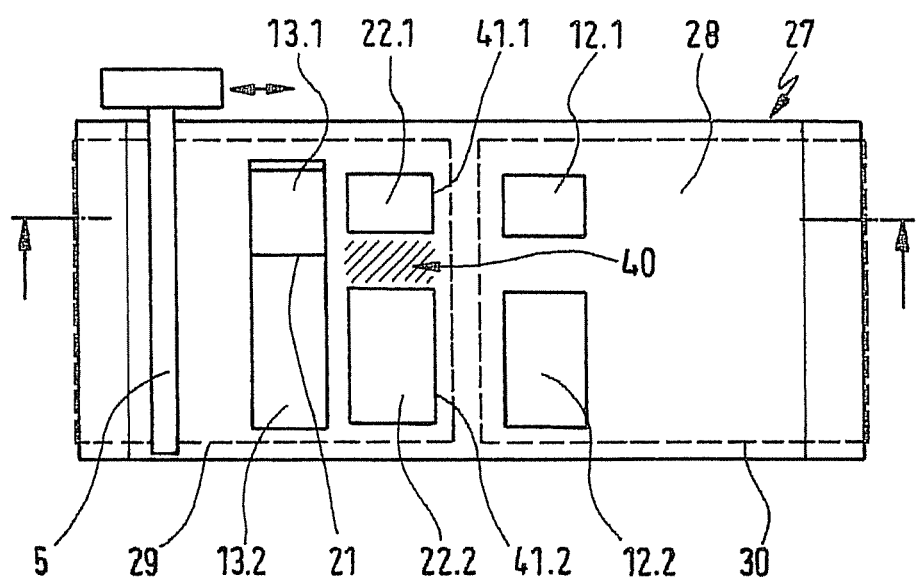
FIG. 5 a plan view of an exemplary assembly of a means for modifying a building space having several modified building areas, in a device according to FIG. 1, according to an embodiment of the present invention.

FIG. 5 exemplarily shows a plan view of the assembly 27 of the means for modifying a building space in an alternative first embodiment of the laser sintering device. The pan 28 here includes several modified separate building areas 22.1, 22.2. The building areas 22.1, 22.2 are separated from each other by areas 40 of the pan 28 between openings 41.1, 41.2 in the bottom of the pan 28, which are part of the confining means. In alternative embodiments, more than two building areas 22.1, 22.2 can be provided by further partitioning the building space 22. The building areas have widthwise different dimensions in this embodiment. However, they can also be identical. Basically, the width of several building areas may be arbitrarily set within the total width.

Furthermore, the assembly 22 here comprises two metering containers 12.1, 12.2 for providing the powder. In alternative embodiments, additional metering containers may be provided according to the number of the building areas 22.1, 22.2. The width of each metering container corresponds to the width of the associated building area. However, the widths may also be different in alternative embodiments.

The building areas 22.1 and 22.2 are spatially separated from each other by a clearance therebetween in a direction of the width of the pan 28. The pan is sufficiently large to prevent the powders from being mixed, which powders are transported from the respective metering containers 12.1, 12.2 to the respective building areas 22.1, 22.2.

Referring again to FIG. 5, the application device 5 is shown at a position after having transported the powder from the metering containers 12.1, 12.2 to the building areas 22.1, 22.2, and after having deposited excess powder into the overflow containers 13.1, 13.2. The application device 5 supplies the different building areas 22.1, 22.2 with the respective powder in substantially one motion.

Figure 6:
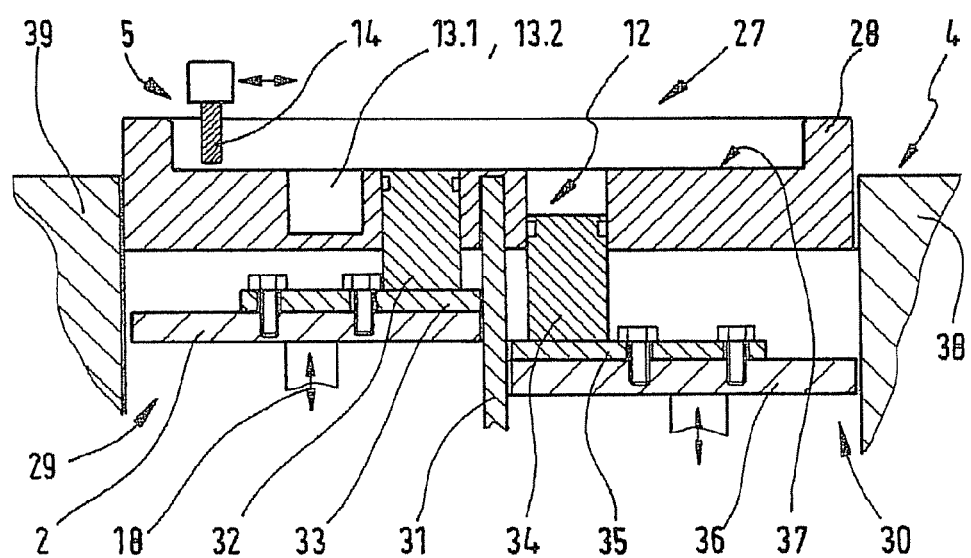
FIG. 6 a lateral section view of the assemblies of FIGS. 4 and 5.

Referring now to FIG. 6, the assembly 27 of FIGS. 4 and 5 is shown in a lateral view of a lateral section. The pan 28 is shown in a way that it is introduced from the top into the original metering container area 30 and the original building container area 29 and receives the original intermediate wall 31 in a crosswise groove.

The overflow containers 13.1, 13.2 are depicted here to be integrated into the pan. However, the overflow containers may also be incorporated as a separate container into the pan 28.

The assembly 27 includes, as further components of the confining means, one or more downsized building platforms 32 as supports in the openings 41.1, 41.2, wherein the supports are arranged in the building area 22.1 as shown in FIG. 4 and in the building area 22.1 and 22.2 as shown in FIG. 5, and their ground area is a part area of the building platform which is adapted to the horizontal dimension of the respective building area. The downsized building platforms 32 are fixed to the building platform 2 which is moved upwardly or downwardly during the manufacturing process by a connection means, here a connection plate 33, and are connected to each other, if necessary, thereby enabling both connected downsized building platforms 32 to move concurrently. Thereby, the building platform 2 and the downsized supports 32 are also concurrently moved upwardly and downwardly.

In the metering container or in the metering containers, wherein only one metering container 12 is shown in the section view, a metering container stamp 34 for upwardly transporting the powder is provided, respectively. The metering container stamps 34 are connected to each other by a connection plate 35, if necessary, so that they are moved concurrently. The connection plate in turn is fixed to an original metering platform 36.

The manufacturing process is performed in an analogous manner to the previously described manufacturing process, wherein the control unit 11 of the device is formed with means for modifying a building space according to the first embodiment such that a process software may adjust different operation parameters in the separate building areas 22.1 and 22.2 in order to be able to process different powders and generate different properties of the objects 3.

For retrofitting the laser sintering device by the means for modifying a building space 22, for downsizing or partitioning, it is necessary to fix the connection plate 33 having the downsized support 32 or the downsized supports 32 and the connection plate 35 having the metering container stamp 34 or the metering container stamps 34 on the building platform 2 and on the original metering platform, respectively. The pan 28 is introduced in the frame 1 (FIG. 1), in the original building area 29 and the original metering container area 30. The pan 28 then abuts at the lateral borders thereof to an upper surface of the frame 1 so that a plane 37 is located on the bottom of the pan 28 slightly above the building plane 4. The pan is fixed in the device by suitable fixing means, and may be permanently fixed in alternative embodiments, for example by welding.

Figure 7:
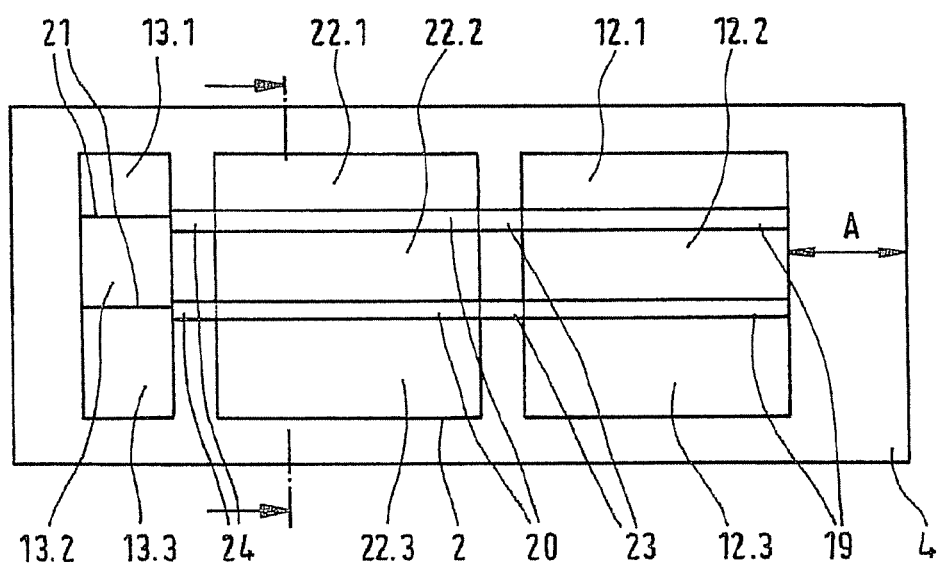
FIG. 7 a plan view of a building plane of a device having a means for modifying a building space, in which the application device is not depicted, according to another embodiment of the present invention.

FIG. 7 shows a plan view of the building plane 4 of a device having means for modifying a building space according to a second embodiment. The application device is not depicted.

The metering container differs in this second embodiment from the metering container shown in FIG. 5 by two vertical metering container partitioning walls 19 which extend in FIG. 7 from the left to the right, that means, in the moving direction A, and they subdivide the metering container such that three metering containers 12.1, 12.2 and 12.3 are formed, wherein the metering container partitioning walls 19 are fixed on the upper side of the stamp and the piston, respectively.

In an analogous manner, also the building space 22 above the building platform 2 (FIG. 2) is subdivided by two building space modifying elements, here building space partitioning walls 20 as building space partitioning elements, in three building areas 22.1, 22.2, 22.3. Here, the building areas 22.1, 22.2, 22.3 are also set by partial surfaces of the building platform 2, respectively. The metering container partitioning walls 19 and the building space partitioning walls 20 are aligned to each other, respectively.

The overflow container in the second embodiment of the invention is also subdivided by walls 21, which are also aligned to the metering container partitioning walls 19 and the building space partitioning walls 20, in three overflow containers 13.1, 13.2 and 13.3.

Between the metering container partitioning walls 19 and the building space partitioning walls 20, intermediate partitioning walls 23 are provided which respectively extend in the moving direction A. Between the building space partitioning walls 20 and the walls 21 in the overflow container 13, intermediate partitioning walls 24 are provided. Each of them has the function, that in a case where different powders 16 are used for the different building areas 22.1, 22.2 and 22.3, the powders are not mixed between the building areas 22.1, 22.2 and 22.3, the metering containers 12.1, 12.2 and 12.3 and the overflow containers 13.1, 13.2, 13.3. The metering container partitioning walls 19, the building space partitioning walls 20 and the intermediate partitioning walls 23 each have the same width. The intermediate partitioning walls 24 may have the same or smaller width. The intermediate partitioning walls 20 and the intermediate partitioning walls 24 are fixed such that they protrude from the building plane 4 to the top.

Figure 8A:
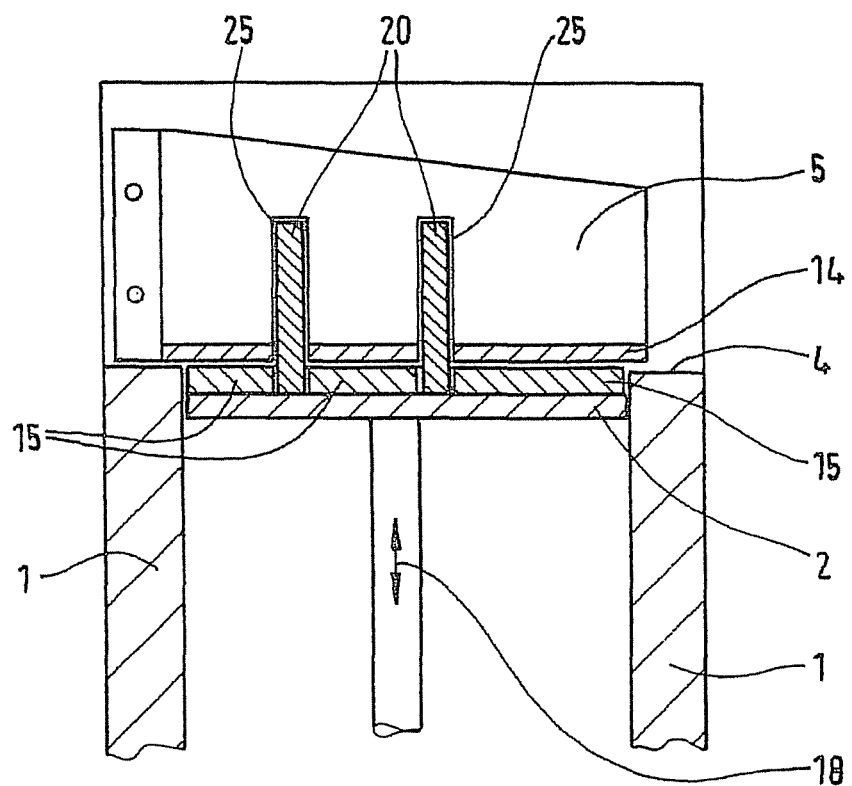
FIG. 8a a sectional view of the building plane shown in FIG. 7, along an intersection line, at the outset of a process for manufacturing of objects by layerwise solidification of a powdery building material, according to another embodiment of the present invention.

FIG. 8a shows a section view of the building chamber according to the second embodiment along an intersection line as shown in FIG. 7 at the outset of the process of manufacturing of objects.

The construction is substantially the same as the construction shown in FIG. 3. The difference, as shown here, is the arrangement of the building space partitioning walls 20. The building space partitioning walls 20 are fixed on the building platform 2. Between the individual building space partitioning walls 20 and between the building space partitioning walls 20 and the frame 1, building plates 15 are arranged on the building platform 2, respectively, the upper surfaces thereof lie in the building plane 4 at the outset of manufacturing of objects. The height of the building plates is substantially equal to the minimum height of the building space partitioning walls 20 so that they serve as filling bodies. The building plates 15 can be removed together with the formed object 3, for example after completion. However, it is not necessary to provide the building plates.

The application device 5 as a component of the common application unit of the different building areas 22.1, 22.2 and 22.3 comprises a recess 25 in the shape of a slot or a gap for each building space partitioning wall 20, thereby subdividing the blade 14 into several partial blades. The recesses 15 are formed such that they have a small clearance at their surface adjacent to the building space partitioning walls 20 in order to transport the powder as completely as possible without any loss by the clearance in the building space on the one hand, and in order to secure a process to save transport of the powder in spite of potentially occurring manufacturing tolerances, thermal expansion and clearances in the bearing elements on the other hand.

Figure 8B:
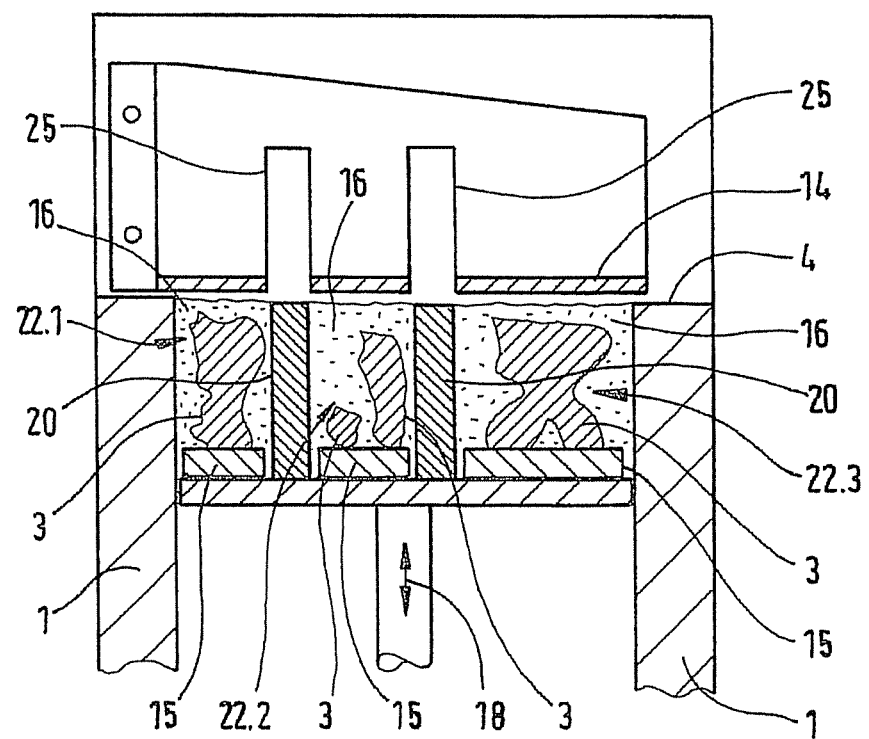
FIG. 8b a sectional view of the building plane shown in FIG. 7, along an intersection line, at the end of the process of manufacturing of objects by layerwise solidification of a powdery building material, according to another embodiment of the present invention.

FIG. 8b shows the second embodiment as represented in FIG. 8a at the end of manufacturing the objects. Identical elements are designated with the same reference signs, and are not described again.

The building space partitioning walls 20 have a height which secures that the powders 16 are kept separated and are not mixed with each other in the different building areas 22.1, 22.2 and 22.3 also at the end of the manufacturing process of the objects 3. The height corresponds at least to the maximum height of the objects which can be realized.

Functional gaps or tolerance gaps which occur in the longitudinal direction of the building space partitioning walls between the building space partitioning walls 20 and the walls of the building areas 22.1, 22.2 and 22.3 may be closed by sealing elements, such as silicone lips.

The manufacturing process is performed in an analogous manner to the previously described manufacturing process, wherein also the control unit 11 of the device is formed with means for modifying a building space according to the second embodiment such that a process software can adjust different operation parameters in the separate building areas 22.1, 22.2 and 22.3 in order to be able to process different powders and generate different properties of the objects 3.

Figure 9:
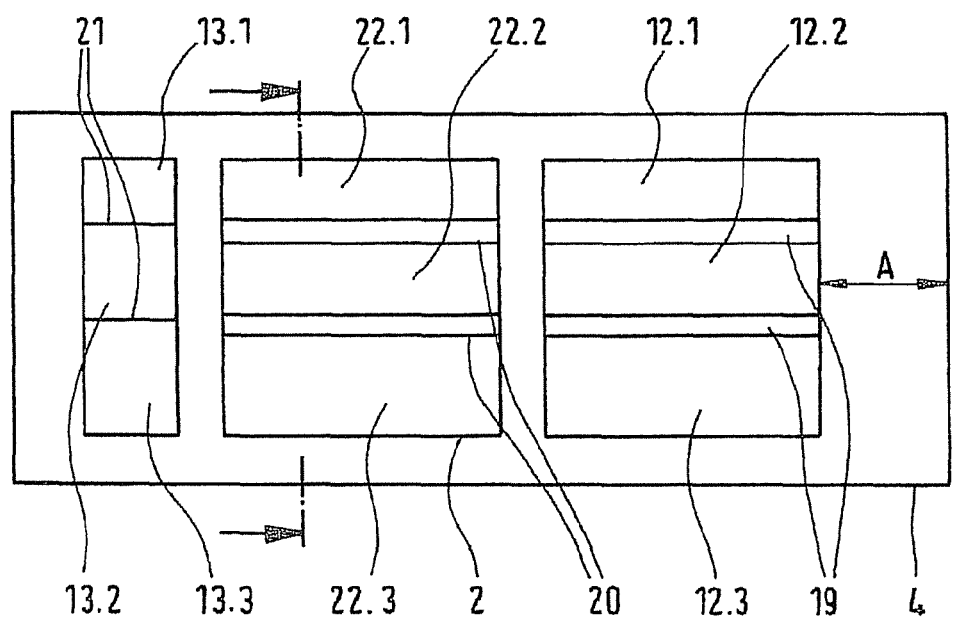
FIG. 9 a plan view of a building plane of a device having a means for modifying a building space, in which the application device is not depicted, according to still another embodiment of the present invention.
Figure 10A:
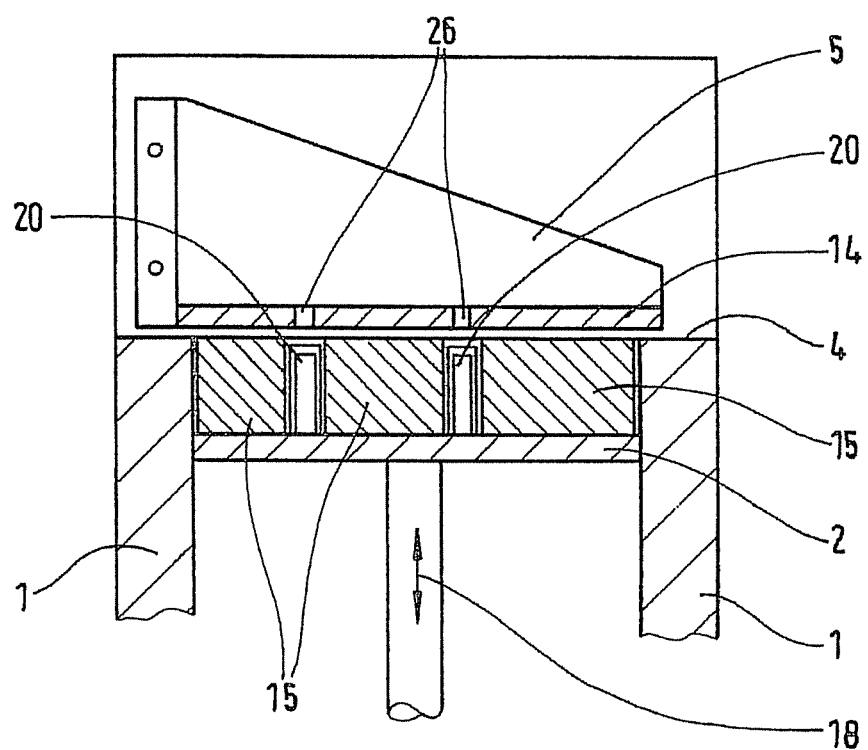
FIG. 10a a sectional view of the building plane shown in FIG. 9, along an intersection line, at the outset of the process of manufacturing of objects by layerwise solidification of a powdery building material, according to still another embodiment of the present invention.
Figure 10B:
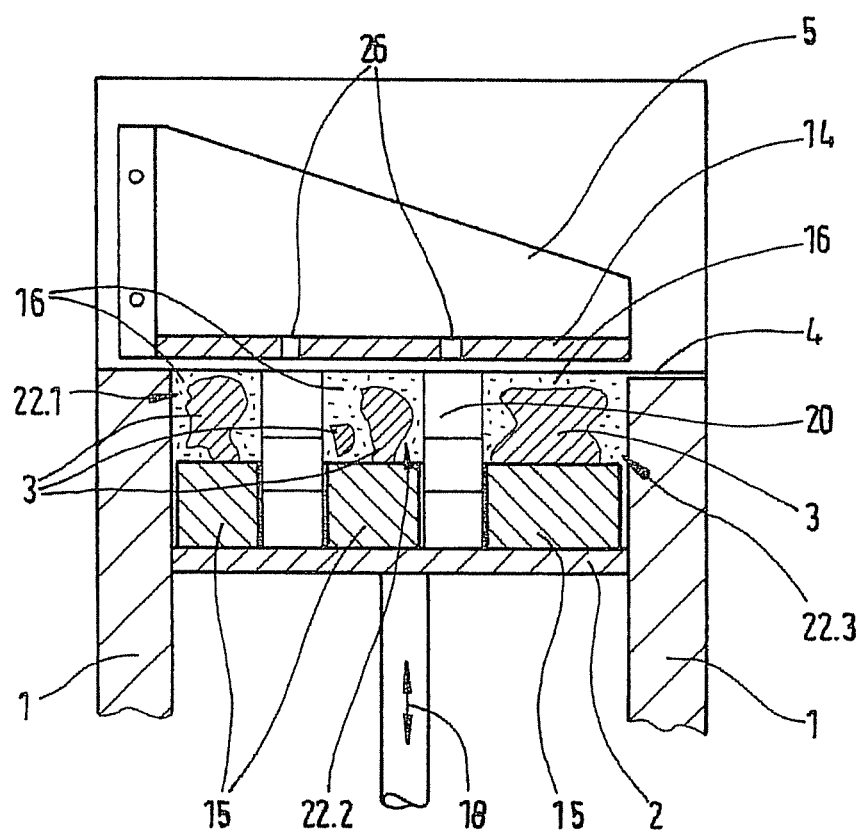
FIG. 10b a sectional view of the building plane shown in FIG. 9, along an intersection line, at the end of the process of manufacturing of objects by layerwise solidification of a powdery building material, according to still another embodiment of the present invention.

FIGS. 9, 10a and 10b show a third embodiment of the means for modifying a building space according to the invention, which is substantially the same as the second embodiment, but differs in the construction of the building space partitioning walls 20 and the metering container partitioning walls 19. Here, identical elements are designated with the same reference signs, and are not described again.

The building space partitioning walls 20 and the metering container partitioning walls 19 of the third embodiment do not have a fixed height as in the second embodiment, but there are building space partitioning walls 20 and metering container partitioning walls 19 having variable height, which are realized by plates, for example, which are extendable and collapsible like a telescope. The lower end of the building space partitioning walls 20 is mounted to the building platform 2, and the upper end of the building space partitioning walls 20 is mounted such that the upper edge lies in the height of the building plane 4, the lower end of the metering container partitioning walls 19 is mounted at the stamp and the piston of the metering containers, respectively, and the upper end of the metering container partitioning walls 19 is mounted such that the upper edge lies in the height of the building plane 4.

On the building platform 2 of the device, in each building area 22.1, 22.2 and 22.3, each building plate 15 is arranged in such a height that the upper surfaces thereof are located in the outset position of the building platform 2 in the building plane 4 together with the upper surfaces of the building space partitioning walls 20, which are now in a telescope-like collapsed condition.

Also in this embodiment, functional gaps and tolerance gaps, respectively, between the building space partitioning walls 20 and the walls of the building areas 22.1, 22.2 and 22.3 may be closed by sealing elements, such as by silicone lips.

Building space partitioning walls may be arranged in a further embodiment as a further development of the third embodiment additionally or alternatively also in one direction vertical to the moving direction A as shown in FIG. 9, that means, vertical to the building space partitioning walls 20 as viewed in FIG. 9. By this alternative, it is possible to confine and thus to downsize the respective building area also in the direction A.

In a further development of this embodiment, it is not only possible to use elongated building space partitioning walls, but also partitioning walls which have a rectangular or other shaped frame when viewed from above. The individual frame elements, which are nested one over another, are nested into each other like a telescope at the outset of the manufacturing process, and they form a container which is adjustable in height and has a lower height at the outset of the manufacturing process, wherein the height thereof increases when the process proceeds. The upper surface of the frame is at the level of the building plane 4, and the lower end of the frame is mounted on the building platform 2. Here, the use of sealing elements is not necessary.

Since the building space partitioning walls 20 do not protrude from the building plane 4 in this third embodiment, recesses in the application device 5 are not necessary. However, the blade 14 of the application device 5 here includes subdividing elements 26 which protrude beyond the blade in a movement direction A, as indicated in FIG. 9, of the blade 14 shown in FIGS. 10a and 10b. The subdividing elements 26 extend along the whole height of the blade 14.

The subdividing elements 26 have the function to prevent the different powders 16 from being mixed during the transport from the metering containers 12.1, 12.2, 12.3 to the building areas 22.1, 22.2, 22.3 since they protrude beyond the blade 14 when they are moved, and thus to separate the areas of the different powders 16 in the movement direction in front of the blade 14.

Like in the first and second embodiments, also in the third embodiment the control unit 11 of the device is formed such that a process software can adjust different operation parameters in the separate building areas 22.1, 22.2 and 22.3 in order to be able to process different powders and to generate different properties of the objects 3.

In the second and third embodiments, the building spaces are separated by the building space partitioning walls 20 in three building areas 22.1, 22.2 and 22.3, the metering container is separated by the metering container partitioning walls 19 in the metering containers 12.1, 12.2 and 12.3, and the overflow container 13 is separated by the overflow container partitioning walls in three overflow containers 13.1, 13.2 and 13.3. By another number of partitioning walls, it is possible, for example, to separate the building space in two building areas, to separate the metering container in two metering containers, and to separate the overflow container in two overflow containers, respectively, when one partitioning wall is used. By use of several partitioning walls, the respective building space and both containers can be separated into several building areas and associated containers. The width of the building area and the associated container may be selected by the selection of the distances and/or the width of the partitioning walls to each other. In this way, building areas having different widths may be adjusted, meaning that asymmetric building spaces may be used for objects having different sizes.

By subdividing the building space with the means for modifying a building space into several building areas, there is also the possibility not to use all building areas for manufacturing objects. By use of the means for modifying a building space with several building areas, for example, by manufacturing objects in only one building area, downsizing of the building space is also achieved. In the second and third embodiments, the building space is not only subdivided in several building areas by the selection of a suitable width of an element for modifying the building space, but the building space may also be downsized to the surface of a building area. The remaining surface of the building platform 2 is covered by the element for modifying a building space. The application device is then adapted accordingly.

The means for modifying a building space can be formed as a replaceable unit for a device for manufacturing a three-dimensional object by layerwise solidification of a powdery building material. Herein, the replaceable unit for the device can be formed such that it includes an area of the building plane 3, and the metering container 12, the building platform 2 having the corresponding building space partitioning walls 20, and if necessary, the intermediate partitioning walls 23 and the overflow container 13 are arranged at the insert. The application device 5 may be provided as a separate element of the retrofitting assembly either with one or several recesses 25 or with one or several subdividing elements 26 in accordance with the present case. The drive of the building platform is part of the device and not part of the retrofitting unit. The retrofitting units may be provided in different configurations having different numbers and sizes of building areas so that several smaller devices are provided for the user.

In a further modification, the metering container is also arranged above the application device. Here the metering container is also subdivided corresponding to the number and position of the building space partitioning walls, and the powdery building material is supplied to the application device from above. If necessary, partitioning walls are further provided which prevent the different powders from being mixed when being supplied to the application device.

The described device is not restricted to laser sintering machines. It is applicable to all machines for layer generative methods such as stereolithography which uses a liquid photo-curing resin instead of a powder material in three-dimensional printing, in which the powdery building material is selectively solidified at the locations corresponding to the object by a binder which is applied as droplet particle onto the powder layer, for example, and/or in selective mask sintering, in which a mask and an extended light source are used instead of a laser beam. As a further layer generative method, in which the device according to the invention is applicable, the so-called FDM method (fused deposition modelling) or similar methods may also be performed.

The invention claimed is:

1. An apparatus that manufactures a three-dimension object by layerwise solidification of a building material at locations corresponding to the object in respective layers, the apparatus comprising:
   an application device that applies the building material in the shape of a layer;
   a building platform;
   a building space located above the building platform where solidification of the building material occurs, the building space comprising at least one original building area; and
   a pan that is insertable into the at least one building area, the pan including plural openings and plural supports corresponding to the openings and provided in the openings, so as to confine spatially separated partial building areas of the original building area.

2. The apparatus of claim 1, wherein the pan confines at least two separate partial building area within the building space, and the pan is fixable onto the building platform onto which the object is built-up.

3. The apparatus of claim 1, wherein each of the at least one original building area includes either a separate metering container and overflow container or a shared metering container and/of overflow container, having wherein the partial building areas are spatially adapted to all fit within the at least one original building area, and the pan is fixable onto the building platform onto which the object is built-up.

4. The apparatus of claim 1, wherein the application device is a component of a common application unit of each of the at least one building area, and the pan is fixable onto the building platform onto which the object is built-up.

5. The apparatus of claim 1, wherein the apparatus is formed as a closed assembly confining at least one of the pan or a combination of multiple supports, at least one metering, container, at least one overflow container and the pan, and the pan is fixable onto the building platform onto which the object is built-up.

6. An apparatus for manufacturing a three-dimensional object having the apparatus according to claim 1, comprising a common building chamber in which each of the at least one original building area are located, and the pan is fixable onto the building platform onto which the object is built-up.

7. The apparatus according to claim 6, further comprising a common gas circulation and gas preparation system coupled to each of the at last one original building areas.

8. The apparatus according to claim 6, further comprising a common irradiation system for the partial building areas.

9. The apparatus according to claim 6, further comprising a control unit including process software capable of adjusting operation parameters associated with the at least one original building areas.

10. The apparatus according to claim 6, wherein the application device comprises a blade, the blade comprising at least one subdividing element to prevent different building materials from being mixed between the partial building areas, the subdividing element being disposed along the height of the blade.

11. The apparatus to claim 6, further comprising walls adapted to confine the original building area, wherein the walls are adjustable in height.

12. The apparatus according to claim 1, wherein the at least one opening is provided in the bottom of the pan and the at least one support is at least one downsized movable building platform support.

13. The apparatus according to claim 1,
   wherein multiple supports are provided corresponding to separate partial building areas and are connected to each other such that the supports are moveable by a single lifting mechanism.

14. The apparatus of claim 1, wherein the pan further comprises openings which correspond to metering and overflow original areas of the building space thereby providing a partial metering area opening and a partial overflow area corresponding to a partial building area.

15. The apparatus of claim 1, wherein the openings are arranged in a direction of the width of the pan which is rectangular with respect to a moving direction of the application device.

16. An apparatus for manufacturing of three-dimensional objects by layerwise solidification of a building material using an energy source which is directed to a build surface at locations corresponding to respective points constituting layers in a build-up of an object, comprising:
- a building platform;
- an application device that applies said building material in the shape of consecutive layers from a supply of said building material;
- a building space having an original build surface area defined in the building platform where solidification of the building material occurs in said build-up of said object and;
- a pan adapted to be inserted into the building space, the pan having plural openings and movable supports corresponding to the openings and movable relative to the openings upon which said object is built, each opening providing a separate build area of lesser surface area than the original build area, the pan sub-dividing the building space into at least one pan build area which is of a lesser surface area than the original build area.

17. The apparatus of claim 16, wherein the pan further defines plural openings which correspond to metering and overflow areas in addition to at least one build area of lesser surface area

* * * * *